Dec. 24, 1968   R. D. KAHN   3,417,867

HOSE MOUNTING BRACKET

Filed April 12, 1967

INVENTOR.
ROBERT D. KAHN
BY
Amster & Rothstein
ATTORNEYS

United States Patent Office 3,417,867
Patented Dec. 24, 1968

---

3,417,867
HOSE MOUNTING BRACKET
Robert D. Kahn, Rockville Centre, N.Y., assignor to Fedtro, Inc., Rockville Centre, N.Y., a corporation of New York
Filed Apr. 12, 1967, Ser. No. 630,397
5 Claims. (Cl. 206—80)

ABSTRACT OF THE DISCLOSURE

A bracket for mounting a coiled length of hose onto a display card. There are three similar brackets, and each is spaced 120° from its neighbors to hold a different portion of the coiled hose. Each bracket includes an elongated body which is grooved, with each groove overlying a different convolution of the coiled hose. Each bracket further has its opposite ends turned inwardly, and said opposite ends pass through and are in contact with the back face of the top layer of the display card. The bottom layer of the display card overlies the ends of the brackets and prevents them from being seen from the back of the card. The brackets maintain the coiled hose in a secure position with respect to the display card, and can be easily removed subsequently by a purchaser.

---

It is the primary object of my invention to provide a new and improved bracket for mounting a coiled hose on a display card in a neat and attractive manner.

It is a further object of my invention to provide a hose mounting bracket of the character described wherein the clip has an elongated body with a plurality of parallel coextensive flutes defining grooves, each such groove being in contact with and holding a separate convolution of the coil thereby to insure that the individual convolutions of the coiled hose do not become loosened or scrambled with one another.

It is still another object of the present invention to provide a hose mounting bracket of the character described wherein three such brackets securely engage spaced portions of a coiled hose to a display card, and while firmly attaching the coiled hose to the display card are capable of being easily removed from the display card by a user of the hose.

It is still a further object of my invention to provide a hose mounting bracket of the character described wherein each bracket is capable of manufacture by mass production techniques and which therefore will not add appreciably to the cost of marketing a coiled hose.

The above brief description, as well as further objects, features, and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
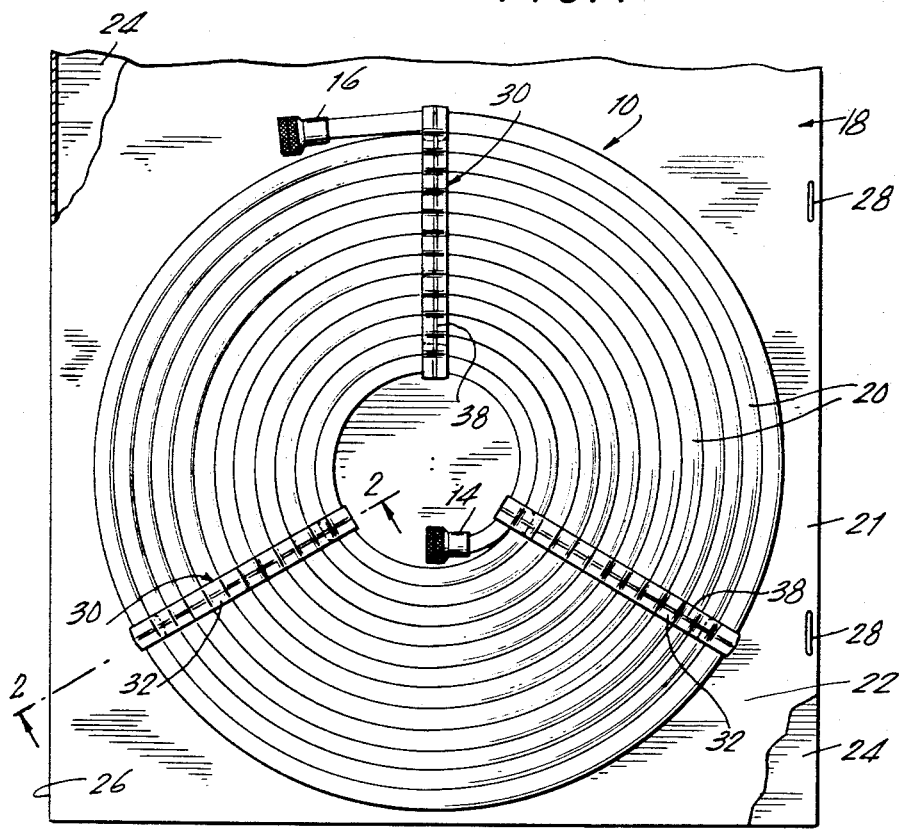
FIG. 1 is a plan and partially broken away view of a coiled length of hose held by three brackets of the present invention to a display card.

Referring now in detail to the drawings, reference numeral 10 denotes a length of tubular hose which includes an elongated flexible tube with a conventional coupling 14, 16 at each end. Each coupling is of the type which has an externally knurled head with an internal thread by which it can threadedly engage an externally threaded male member such as an automobile air valve. Desirably, the hose 10 is of a relatively small diameter and may be used in connecting an air pump to the valve of an automobile tire. Typically, such a hose is formed of polyvinyl chloride.

The hose 10 is marketed, carried on a generally flat rectangular display card 18 and for this purpose, the hose 10 is coiled about itself and has each of its convolutions 20 in contact with one face 21 of the display card 18.

The display card 18 is suitably formed from cardboard and includes a front layer 22 and a back layer 24. The front layer and the back layer are parallel, coextensive and are substantially in face to face contact. The front layer and back layer are interconnected by a fold 26 which runs along one side of the display card 18. The front layer and back layer are further connected along a side of display card parallel to the fold 26 by several staples as at 28. Thus, the front layer and back layer of the card are held along two edges by fold 26 and by the staples 28.

The hose mounting bracket of the present invention is designated by the reference numeral 30 and desirably, there are three such brackets utilized to secure the coiled hose 10 to the display card 18. Each of the foregoing brackets is the same and the brackets are spaced 120° apart with respect to the coiled hose 10. It will be appreciated that each bracket overlies and is in contact with radially aligned segments of the successive convolutions 20 of the hose 10.

Since each bracket is alike, only one need be described in detail. Each bracket is elongated radially of the coiled hose 10 and is of a relatively narrow and uniform width. The bracket 30 is formed from a relatively thin stiff though bendable material, aluminum sheet being suitable for this purpose.

Figure 2:
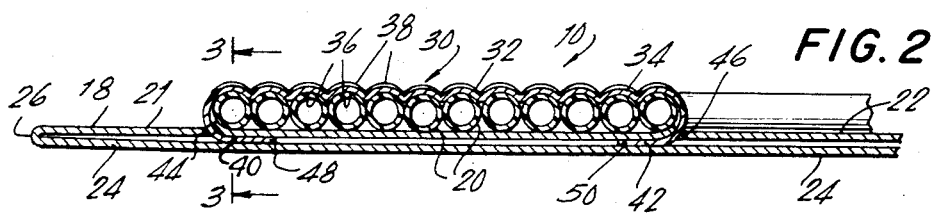
FIG. 2 is a greatly enlarged fragmentary cross-sectional view taken substantially along the line 2—2 of FIG. 1.
Figure 3:
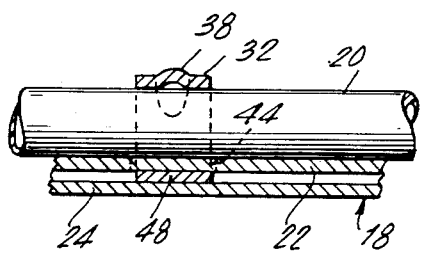
FIG. 3 is a greatly enlarged fragmentary cross-sectional view taken substantially along the line 3—3 of FIG. 2.

The bracket includes an elongated central body 32 characterized by a plurality of parallel coextensive flutes 34 which define an equal number of parallel coextensive grooves 36, the grooves being concave with respect to the coiled hose 10. The grooves run perpendicularly of the body 32 of the bracket. Each groove 36, as best seen in FIG. 2, is of a radius which matches the radius of the tube 10 and has a width which is slightly less than the diameter of the hose 10. The flutes are configured to hold the segments of the hose with which they are in contact in a flat array so that the convolutions of the coiled hose do not become scrambled and so that said convolutions remain flat against the face 21 of the front layer 22 of the display card 18. For strength each bracket has an elongated raised linear central rib 38 which runs longitudinally of the bracket body 32.

The bracket 30 is secured to the display card 18 by its ends 40, 42 which are bent and turned toward one another so that they lie in a plane substantially parallel to the plane of the body 32. The end 40 of the bracket passes about the outermost convolution of the coiled hose 10 and the end 42 passes about the innermost convolution of the coiled hose 10. Each end of the bracket passes through a different slot cut in the front layer 22 of the display card 18, the aforesaid slots being in radial alignment. More specifically, the end 40 passes through a slot 44 and the end 42 passes through a slot 46, both in the front layer. Each end terminates in a flat, the end 40 terminating in a flat 48 and the end 42 terminating in a flat 50. The flats 48, 50 are sandwiched between the front layer 22 and the back layer 24. Each bracket is sufficiently resilient and bendable to be forced into a position in which its flats pass through the aforesaid slots and into a location between the layers of the display card 18, to be hidden therein.

It will be evident from the foregoing that the brackets hold the coiled hose 10 in a neat and attractive flattened condition against the exposed face of the display card 18. When the user desires to remove the coiled hose from the display card, each of the brackets 30 is simply pulled away from the display card, its ends 40, 42 passing outwardly through the slots 44, 46.

A latitude of modification, change and substitution intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. In combination, a display card, a coiled length of hose and a bracket for detachably mounting the hose to the display card, the bracket including a series of parallel flutes defining a series of parallel grooves, each flute abutting and retaining a convolution of the hose against the display card, the card having a pair of aligned apertures formed therein, each of the ends of the bracket passing through a different aperture and terminating in a flat, said flats lying in a plane generally parallel to the plane of the portion of the bracket between its ends.

2. The combination as set forth in claim 1 wherein the bracket has an elongated central raised re-enforcing rib and the bracket is disposed radially with respect to the coiled hose.

3. In combination, a display card, a coiled length of hose and a bracket for detachably mounting the hose to the display card, the bracket including a series of parallel flutes defining a series of parallel grooves, each flute abutting and retaining a convolution of the hose against the display card, the display card including a front layer and a back layer, the ends of the bracket passing between said layers.

4. The combination as set forth in claim 3 wherein the ends of the brackets are turned toward one another, the front layer includes slots, and said ends pass respectively through different slots in the front layer and are sandwiched between the front and back layers.

5. The combination as set forth in claim 3 wherein the front layer and the back layer are joined at opposite sides of the display card.

References Cited

UNITED STATES PATENTS

| 2,971,231 | 2/1961 | Stoddard | 206—59 |
| 2,183,876 | 12/1939 | Sullivan | 206—59 |

FOREIGN PATENTS

| 717,809 | 11/1954 | Great Britain. |

JOSEPH R. LECLAIR, *Primary Examiner.*

J. M. CASKIE, *Assistant Examiner.*